United States Patent [19]

Kawasaki

[11] Patent Number: 5,125,520
[45] Date of Patent: Jun. 30, 1992

[54] TRAY RACK

[76] Inventor: Junzaburo Kawasaki, 2-56-2 Nihonbashi Hamacho, Chuo-ku, Tokyo, Japan

[21] Appl. No.: 734,400

[22] Filed: Jul. 23, 1991

[51] Int. Cl.⁵ .............................................. A47F 5/00
[52] U.S. Cl. .................................. 211/133; 108/91; 211/194; 280/79.3
[58] Field of Search ............... 211/133, 188, 194, 126, 211/186, 189; 108/91; 280/47.35, 79.3, 47.19

[56] References Cited

U.S. PATENT DOCUMENTS

| | | | |
|---|---|---|---|
| 2,762,669 | 9/1956 | Watson | 108/91 |
| 3,303,938 | 2/1967 | Solomon | 211/206 X |
| 4,620,637 | 11/1986 | Karashima | 211/188 |
| 4,795,040 | 1/1989 | Lopez | 211/126 |
| 4,998,023 | 3/1991 | Kitts | 211/188 X |
| 5,048,702 | 9/1991 | Maloney | 211/194 |

Primary Examiner—Robert W. Gibson, Jr.
Attorney, Agent, or Firm—Jordan and Hamburg

[57] ABSTRACT

A tray rack is constructed with a plurality of tray supports of approximately Z-shaped form adapted for supporting trays, each having four through holes arranged in the corners thereof, four supporting columns extending across the four through holes of their respective tray supports and having castors mounted to the lowermost ends thereof respectively, a plurality of spacer tubes fitted onto the four supporting columns for spacing the tray supports at equal intervals, and four retainer members attached to the uppermost ends of the supporting columns respectively for tightly fastening the tray supports and the spacer tubes mounted alternately. Accordingly, the tray racks can nest in a traverse direction for compact storage.

7 Claims, 25 Drawing Sheets

1

TRAY RACK

BACKGROUND OF THE INVENTION

The present invention relates to a tray rack for carrying commodities, e.g., from a storage area to a shop area in a supermarket.

As shown in FIG. 42, a known tray rack comprises a plurality of tray supports C, each having four through holes in the corners thereof and a tray holder portion B provided on the top thereof for holding a tray A, four supporting columns E extending vertically across the four holes of the tray supports C, spacer tubes D fitted onto the four columns D for spacing the tray supports C at equal intervals, four castors F mounted to the lowermost of their respective four columns, and four bolts G screwed into the uppermost ends of the four columns E for securing the tray supports C and the spacer tubes D to the four columns E.

The known tray rack has a plurality of tray supports of rectangular shape and hence, a group of the known tray racks can, when not in use, be arranged only in parallel rows thus requiring a large storage space.

Also, during transportation from the manufacturing plant to a storage or delivery location, such known tray racks are packed in the same manner. More specifically, the number of the known tray racks to be transported in a lot is limited and thus, the cost of transportation will hardly be reduced.

SUMMARY OF THE INVENTION

It is an object of the present invention, for solution of the foregoing drawback, to provide an improved tray rack which requires less storage space when not in use so that a greater number of the tray racks can be stored in a given space and the cost of transportation can be reduced.

The object and other novel features of the present invention will be apparent from the following detailed description accompanied by relevant drawings.

The accompanying drawings are strictly illustrative and of no limitation to the scope of the present invention.

DESCRIPTION OF THE PREFERRED EMBODIMENTS

Figure 1:
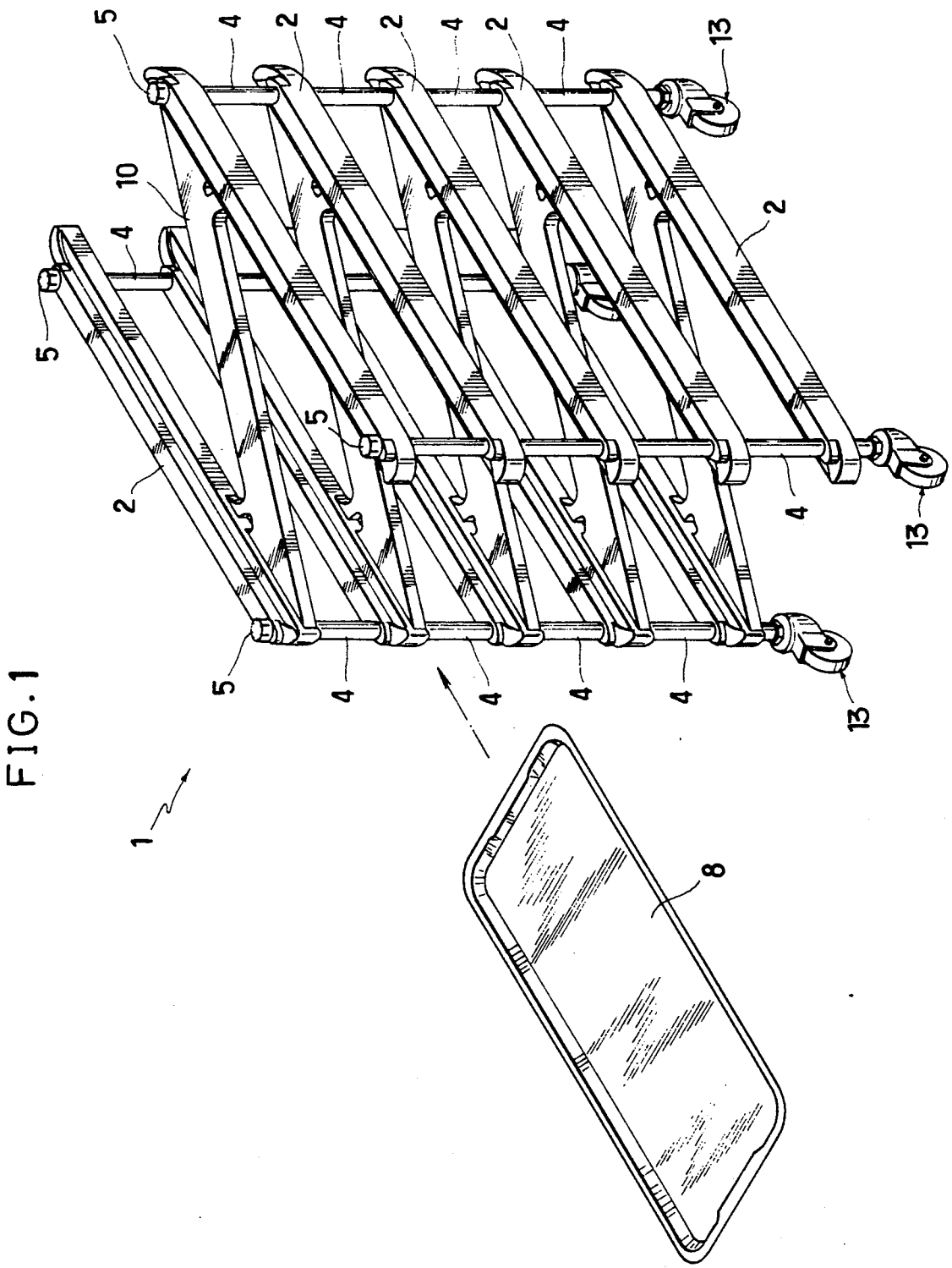
FIG. 1 is a perspective view of a tray rack showing one embodiment of the present invention.
Figure 2:
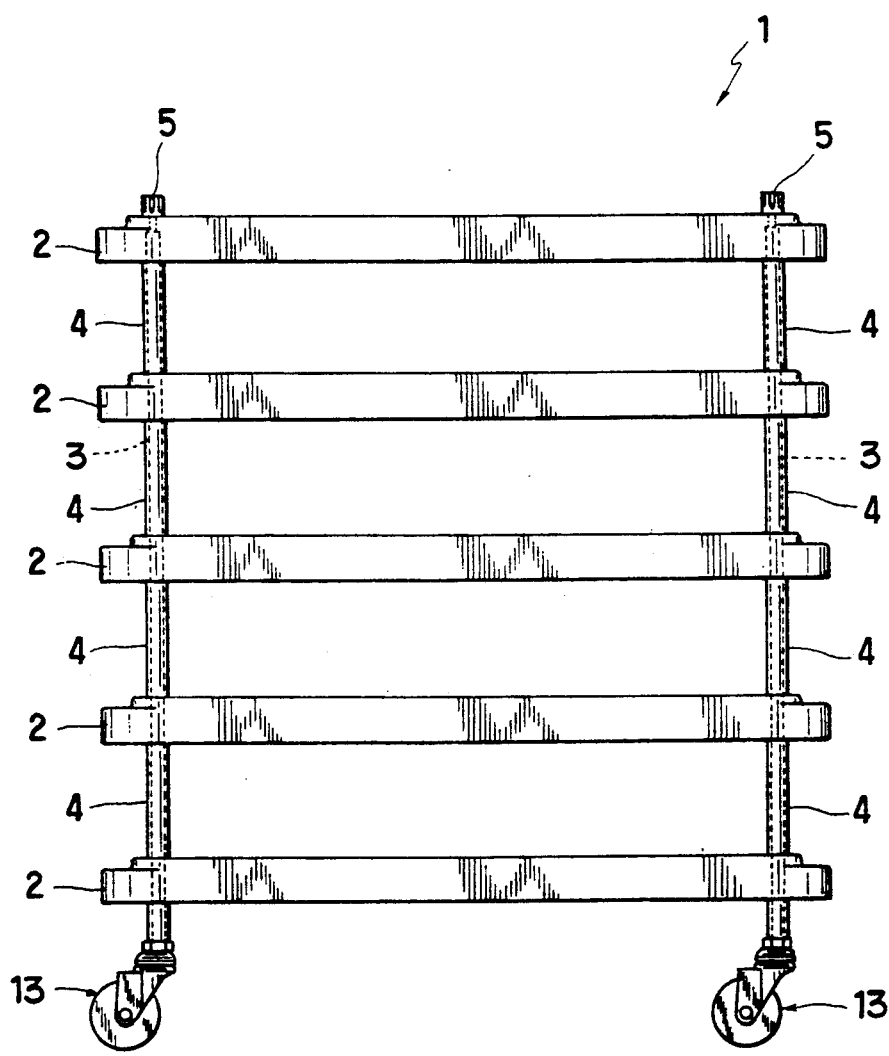
FIGS. 2 to 4 are a front, a side, and a plan view of the tray rack.
Figure 3:
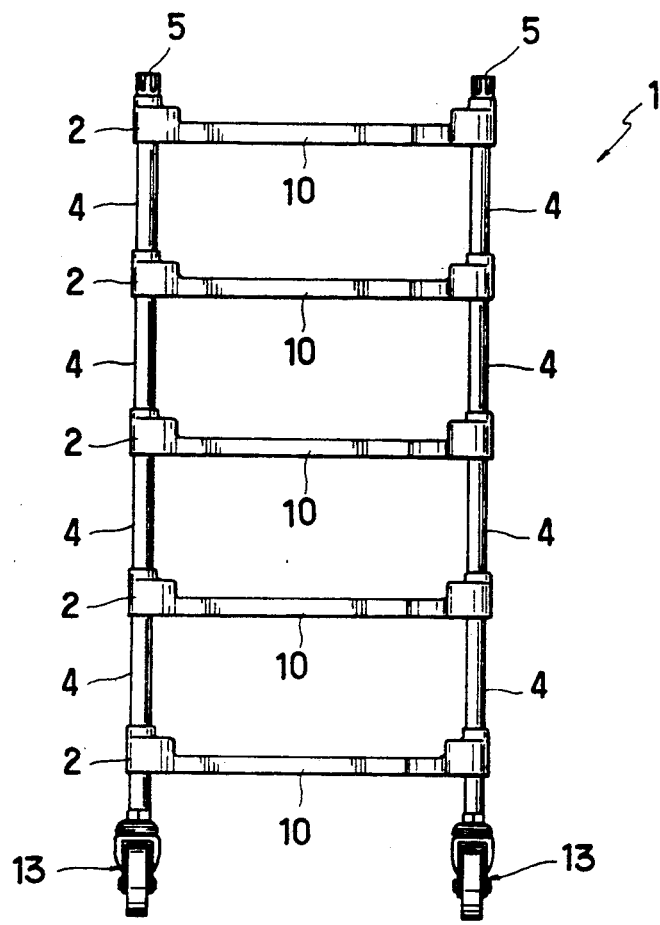
Figure 4:
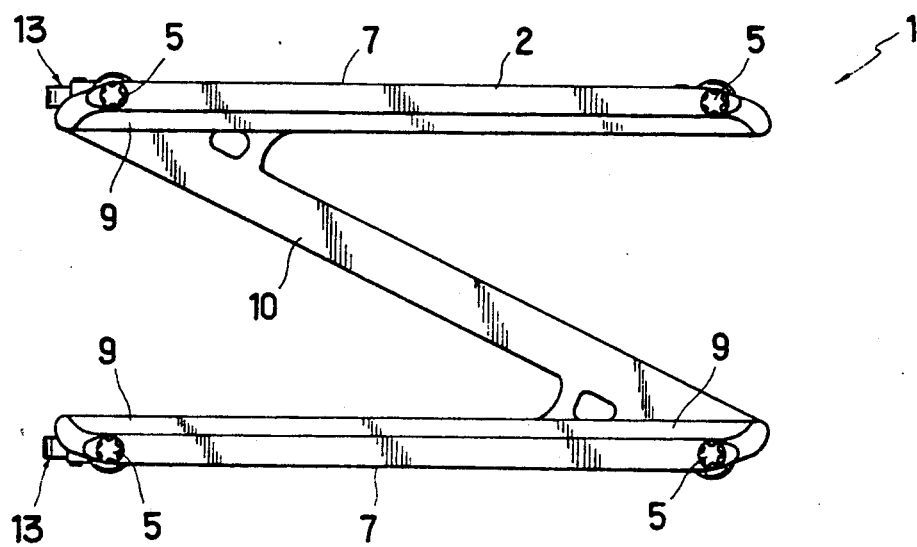

Preferred embodiments of the present invention will be described referring to the accompanying drawings.

FIGS. 1 to 10 illustrate a first embodiment of the present invention in the form of a tray rack 1 which comprises a plurality of tray supports 2, four supporting columns 3, 3, 3, 3 extending across the four corners of their respective tray supports 2, a plurality of spacer tubes 4 fitted onto the four supporting columns 3, 3, 3, 3 for spacing the tray supports 2 at equal intervals, and four retainer screws 5, 5, 5, 5 attached to the uppermost ends of the supporting columns 3, 3, 3, 3 respectively.

Figure 5:
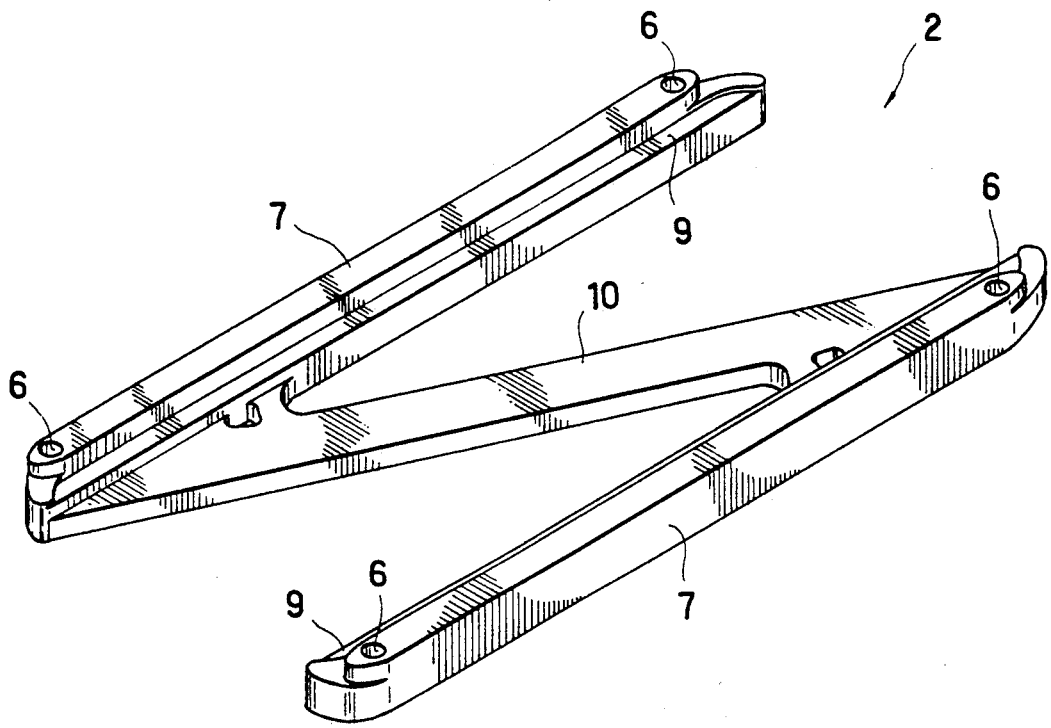
FIGS. 5 and 6 are explanatory views of a tray support of the same.
Figure 6:
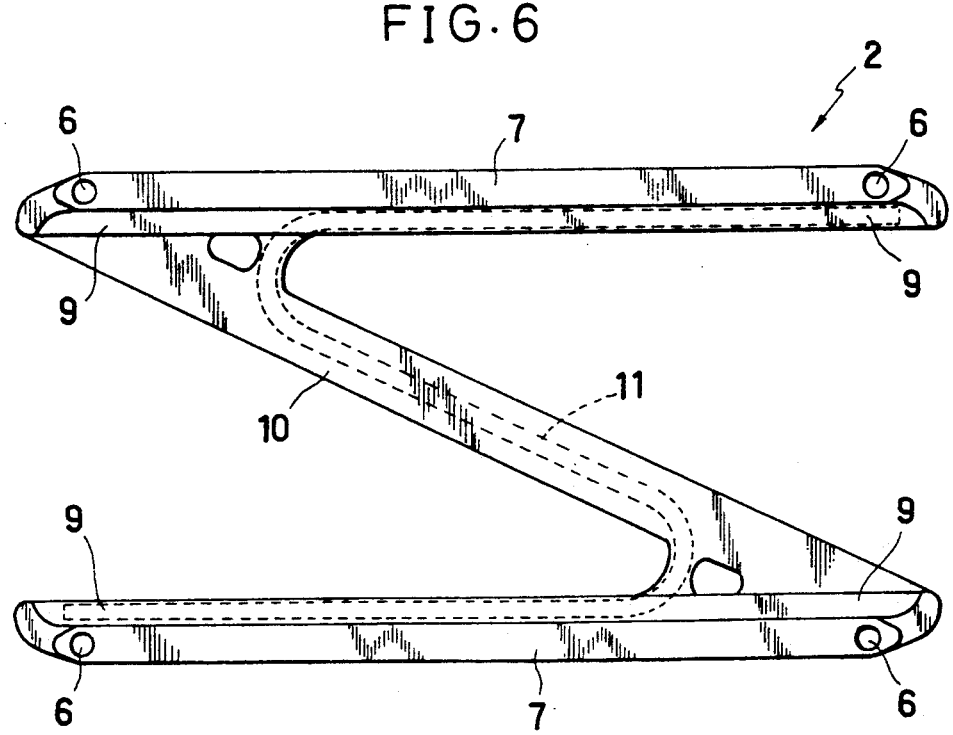

The tray support 2 is mainly consisted of a pair of side bars 7, 7 formed of synthetic resin material and having through holes 6, 6 provided in both ends thereof, two tray holding recesses 9, 9 arranged at upper in the inside walls of the side bars 7, 7 respectively for holding a tray for no slidable movement, a connecting bar 10 of synthetic resin material extending from one end of the side bar 7 to a cross end of the other side bar 7 so that they can form an inverted-Z shape, and an inverted-Z shaped reinforcement bar 11 of metal material embedded or fixedly accommodated in the two side bars 7, 7 and the connecting bar 10, as shown in FIGS. 5 and 6.

Figure 7:
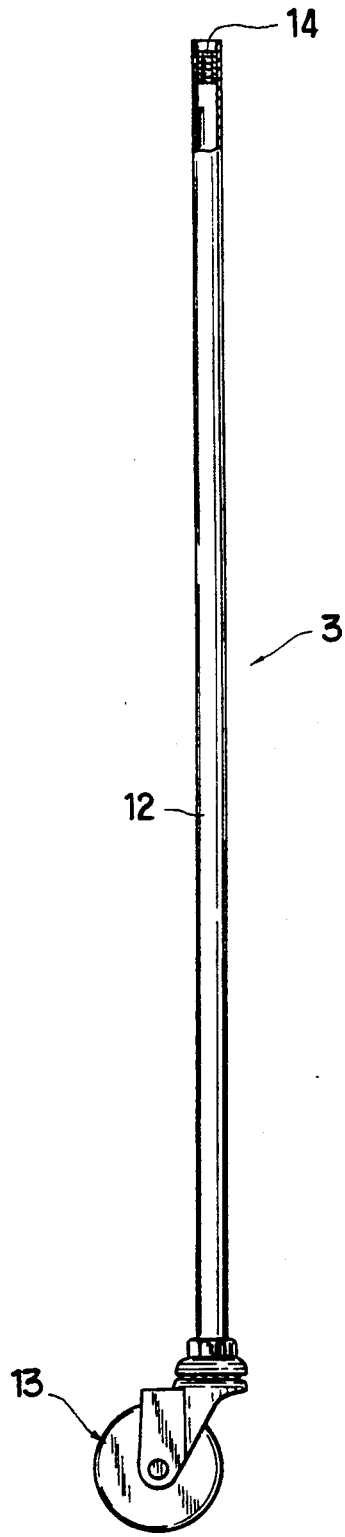
FIG. 7 is an explanatory view of a supporting column of the same.

Each of the four supporting columns 3, 3, 3, 3 comprises a column body 12 made of a tubular material, a castor 13 fixedly mounted to the lowermost of the column body 12, and a threaded bore 14 provided in the uppermost of the column body 12, as best shown in FIG. 7.

Figure 8:
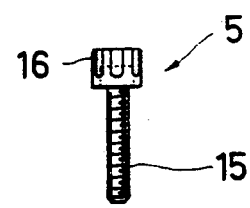
FIG. 8 is an explanatory view of a retainer screw of the same.

The retainer screw 5 is mainly consisted of a thread 15 for engagement with the threaded bore 14 of the supporting column 3 and a head 16 of synthetic resin material fixedly coupled to the rear end of the thread 15, as shown in FIG. 8.

The tray support 2 may be formed of a Z shape with equal success.

The tray rack 1 having the foregoing arrangement is constructed by fitting the tray supports 2 and the spacer tubes 4 alternately onto the four supporting columns 3, 3, 3, 3 and screwing the retainer screws 5, 5, 5, 5 into the threaded bores 14, 14, 14, 14 of their respective supporting columns 3, 3, 3, 3 for tightening the tray supports 2 and the spacer tubes 4.

Figure 9:
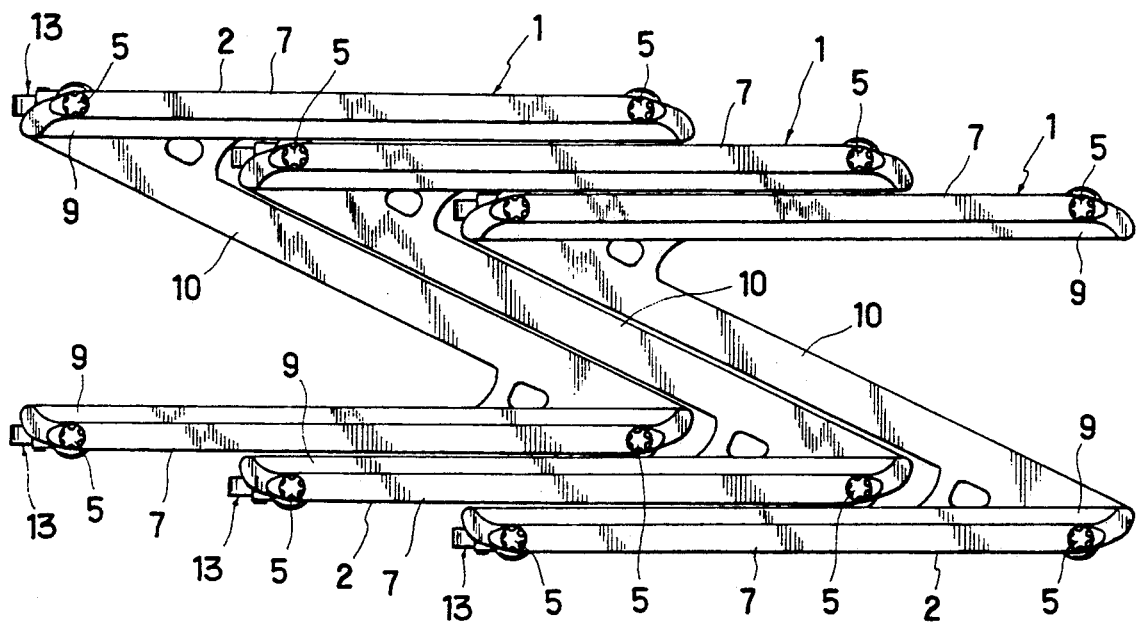
FIG. 9 is an explanatory view showing the nesting of the tray racks for storage.
Figure 10:
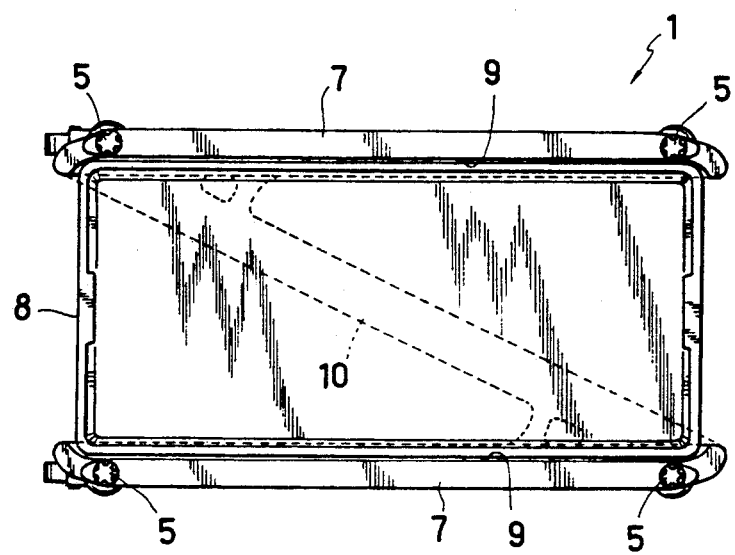
FIG. 10 is an explanatory view of the tray rack holding a tray.

The tray racks 1 can be aligned in a space-saving manner and thus, nest easily for storage as shown in FIG. 9.

In use, trays 8 carrying goods are inserted from one side of the tray rack 1 to be placed in the tray supporting recesses 9. Then, the tray rack 1 can be pushed or pulled for traveling.

Other embodiments of the present invention will now be described referring to FIGS. 11 to 41.

Like components identical to those of the first embodiment are denoted by like numbers throughout the drawings and will not be explained again.

Figure 11:
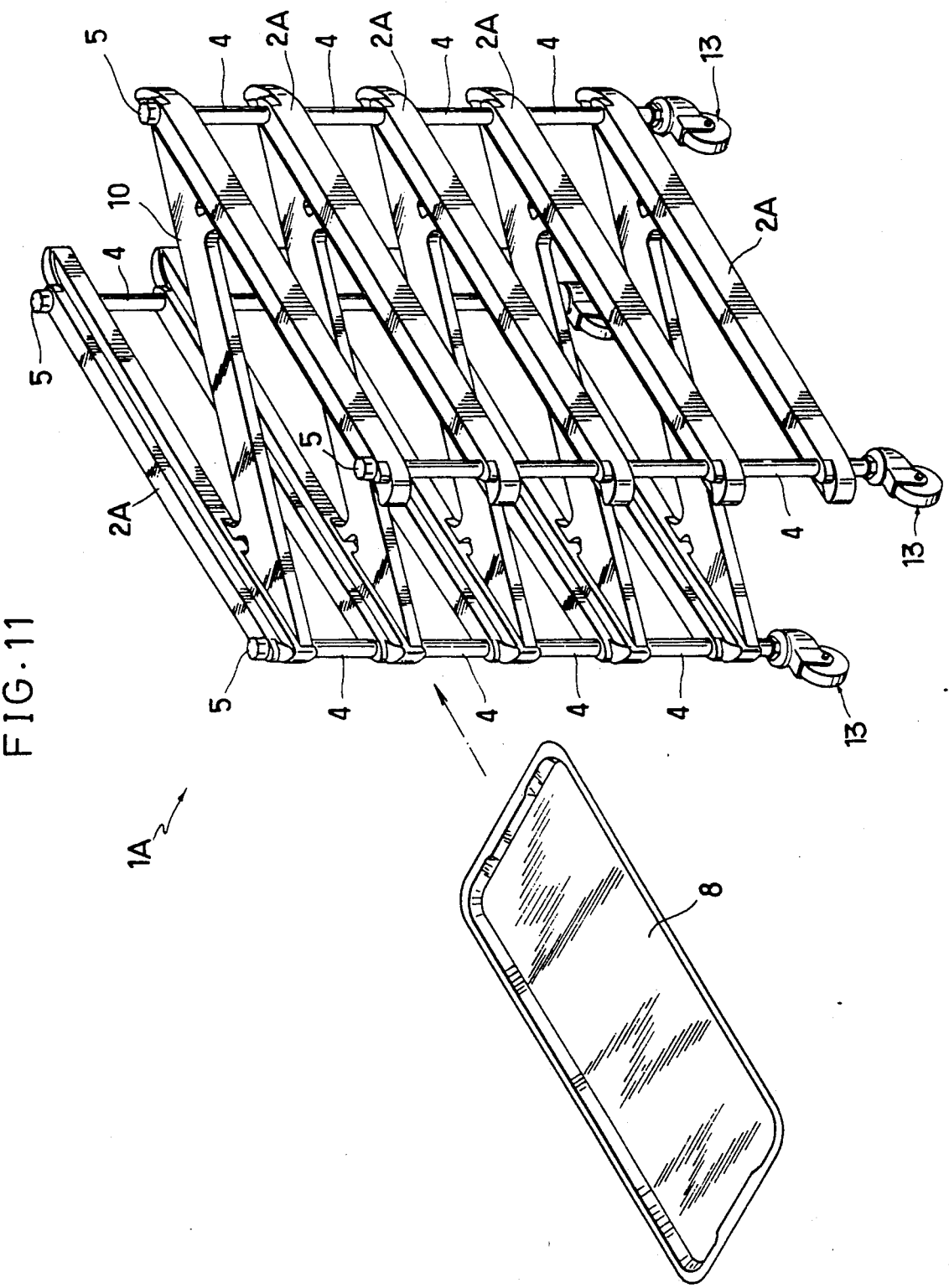
FIGS. 11 to 13, FIGS. 14 to 17, FIGS. 18 to 20, FIGS. 21 to 26, FIGS. 27 to 29, and FIGS. 30 to 41 are explanatory views showing other embodiments of the present invention respectively.
Figure 12:
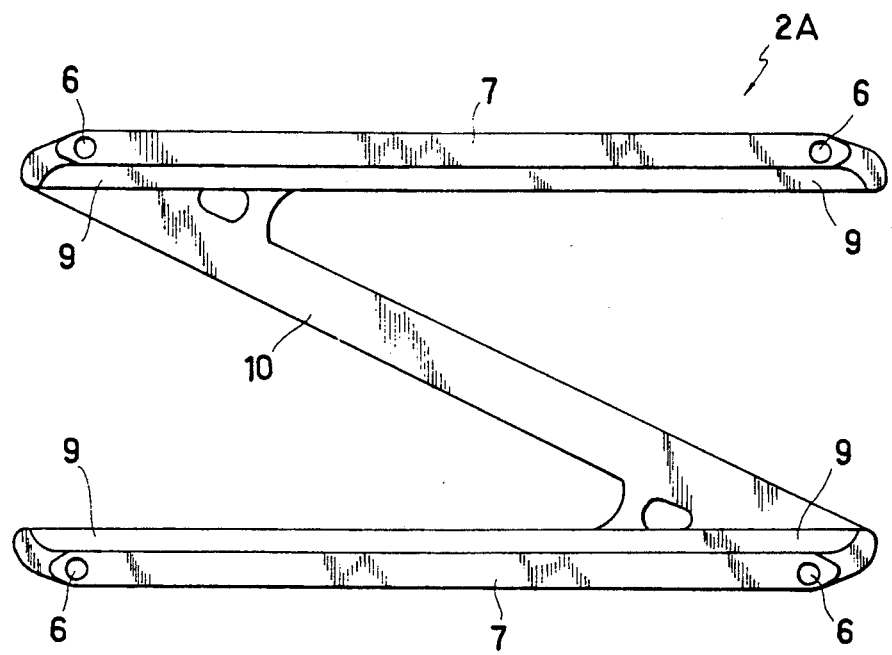
Figure 13:
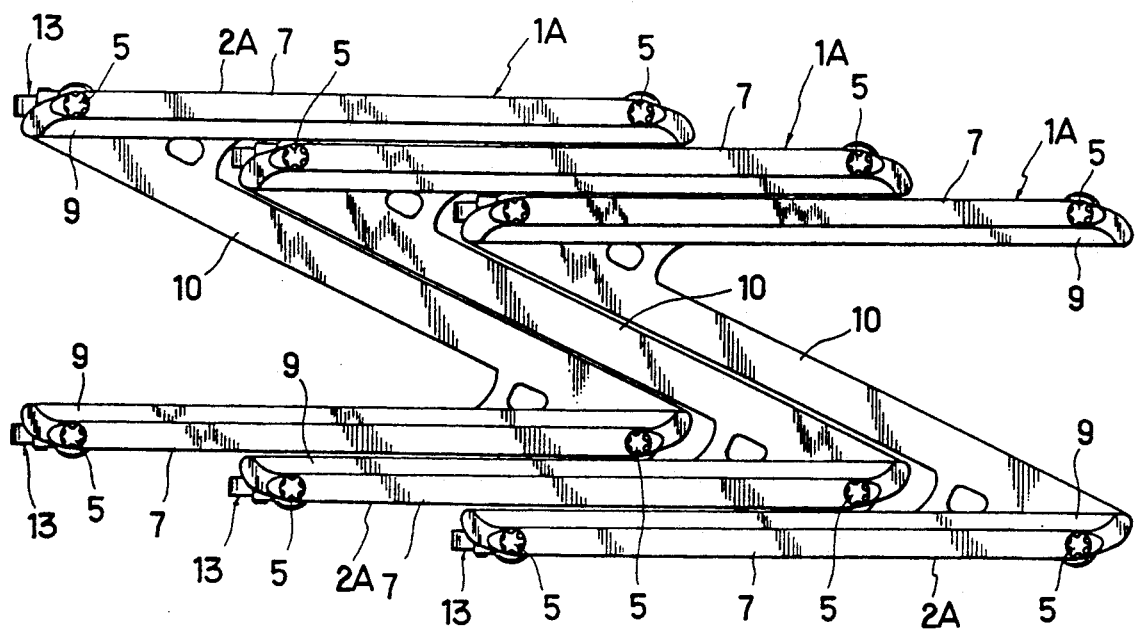
Figure 15:
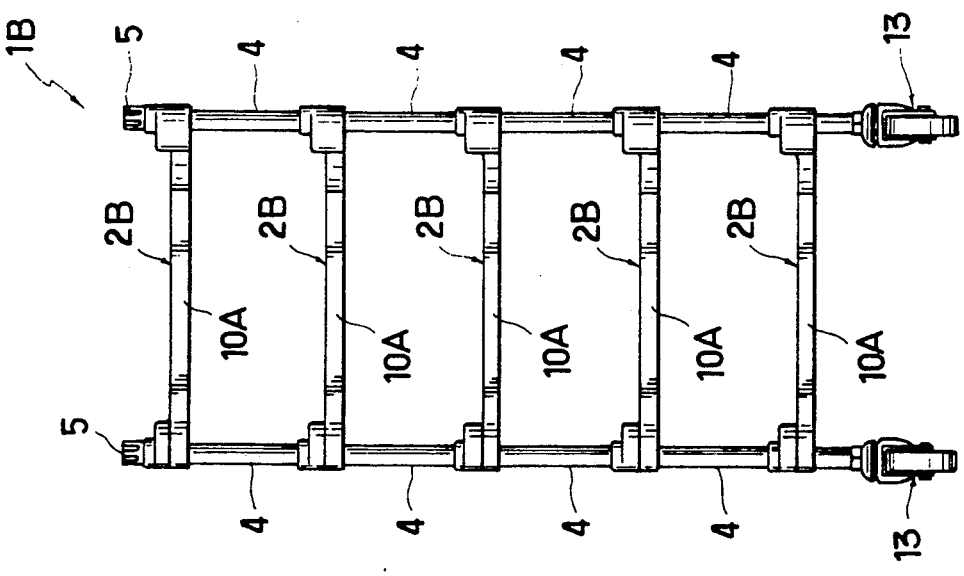
Figure 14:
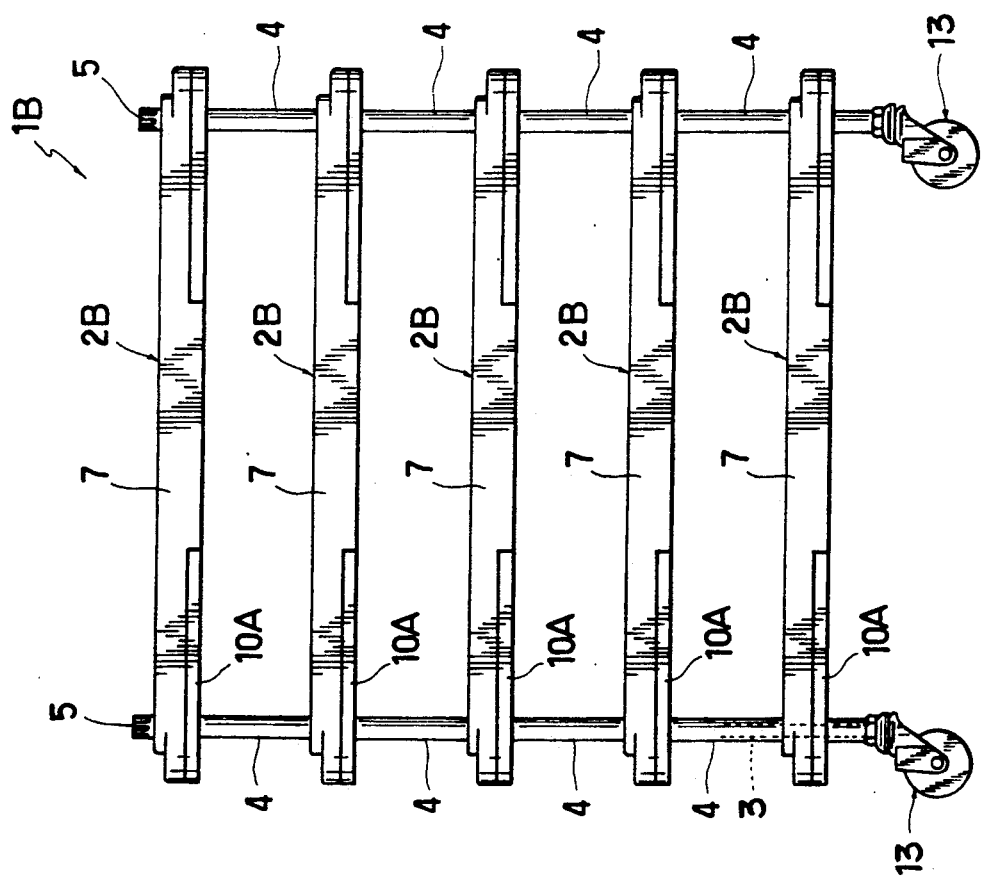
Figure 16:
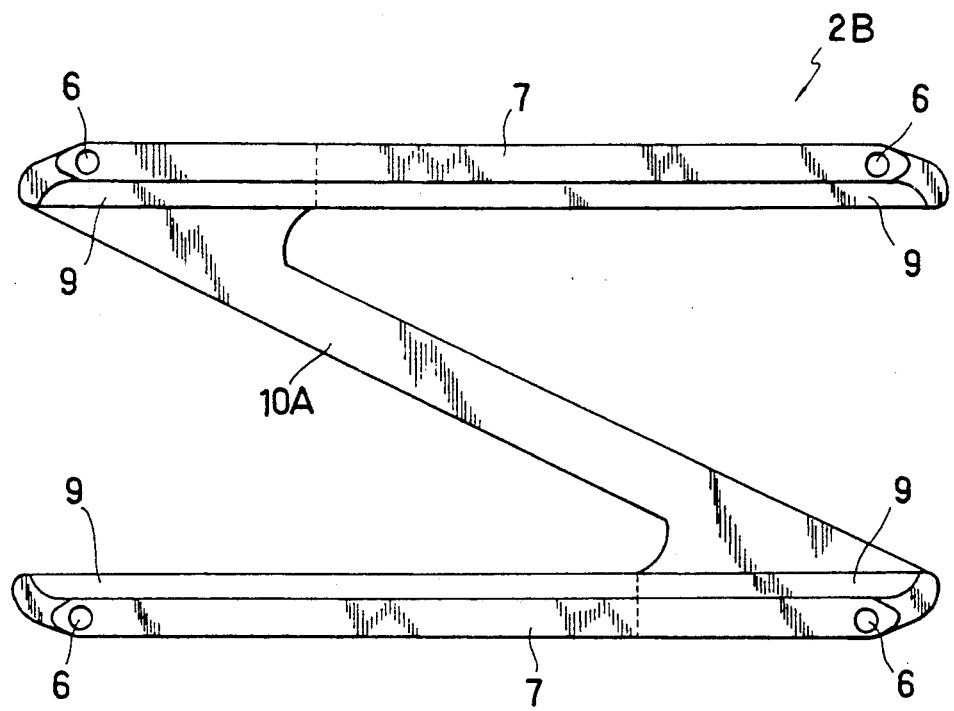
Figure 17:
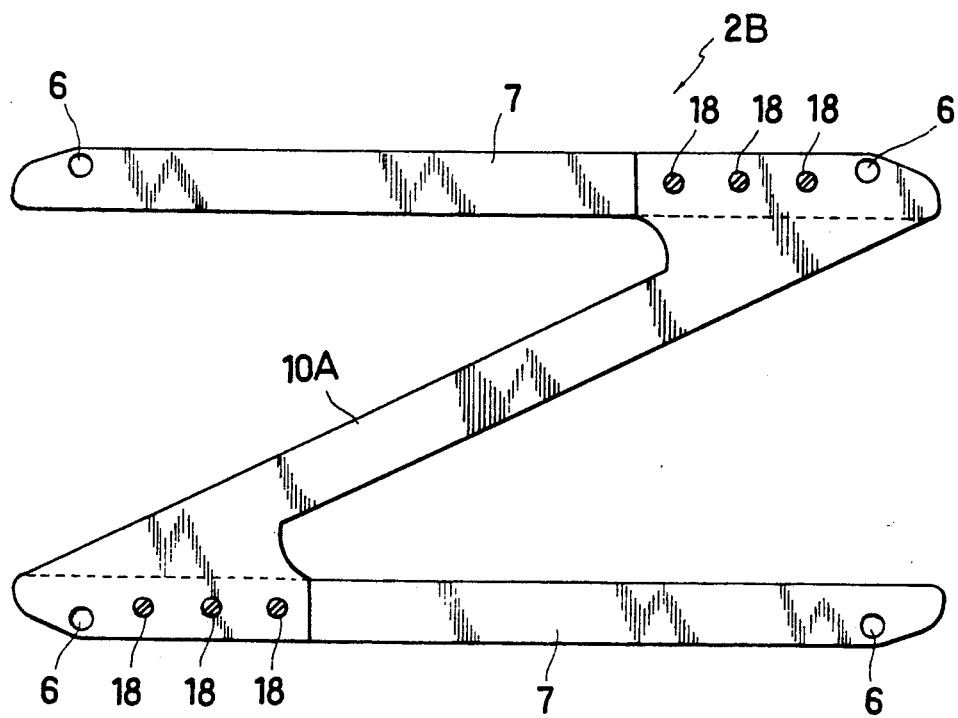

A second embodiment illustrated in FIGS. 11 to 13 is differentiated from the first embodiment by the fact that the two side bars 7, 7 and the connecting bar 10 of each tray support 2A are made of metal material such as aluminum. A tray rack 1A provided with a plurality of the tray supports 2A will be usable with equal success as the tray rack of the first embodiment.

The tray support 2A may be formed by molding a desirably rigid synthetic resin material into an integral form of the two side bars 7, 7 and the connecting bar 10.

FIGS. 14 to 17 show a third embodiment of the present invention which is differentiated from the first embodiment by the fact that the two side bars 7, 7 of each tray support 2B are coupled to each other by an inverted-Z shaped connecting bar 10A of metal material fixedly mounted to the bottom thereof with a plurality of screws 18 or the like. A tray rack 1B provided with a plurality of the tray supports 2B will also be usable with equal success as the tray rack of the first embodiment.

Figure 18:
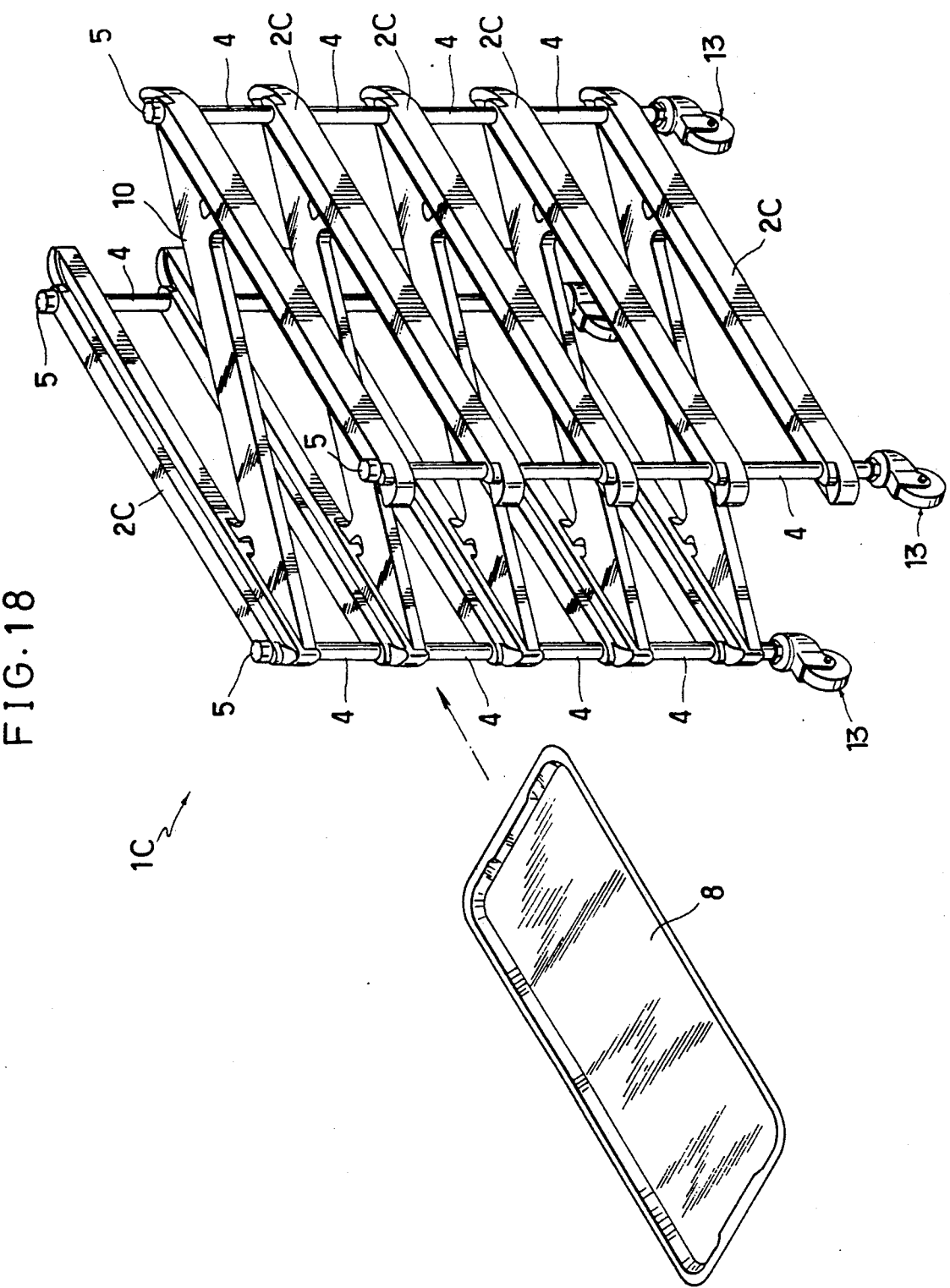
Figure 19:
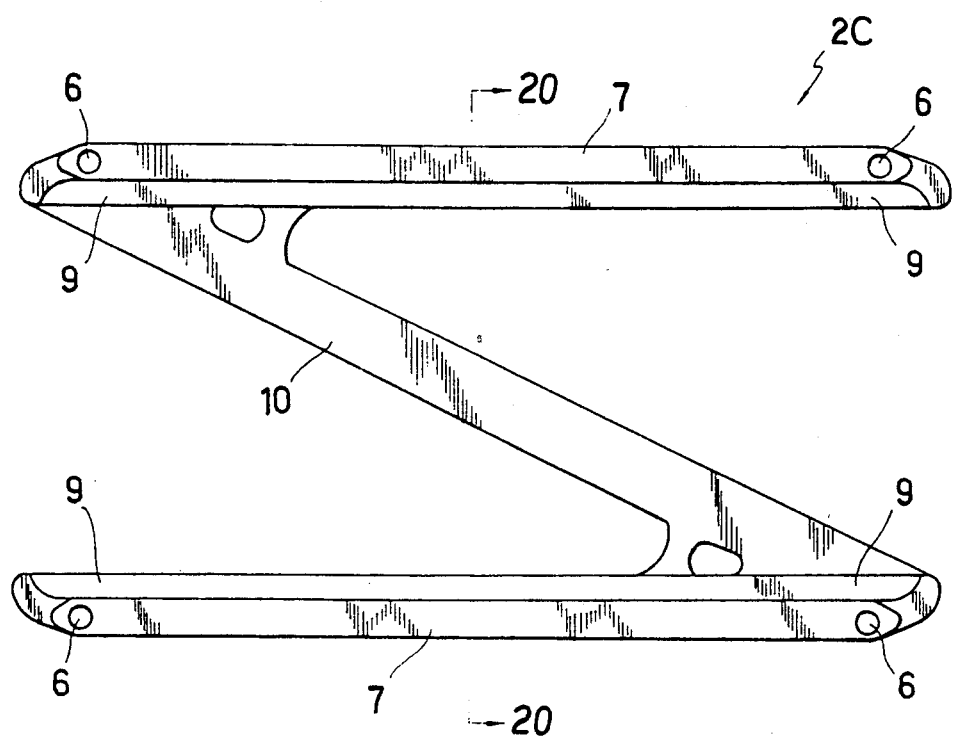
Figure 20:
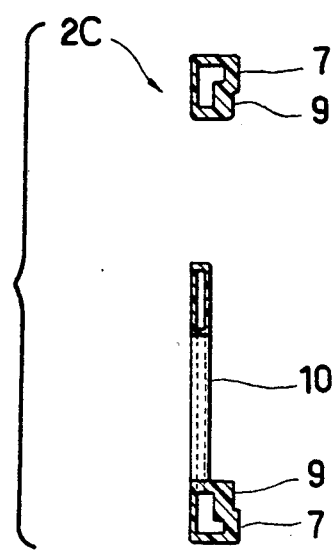
Figure 21:
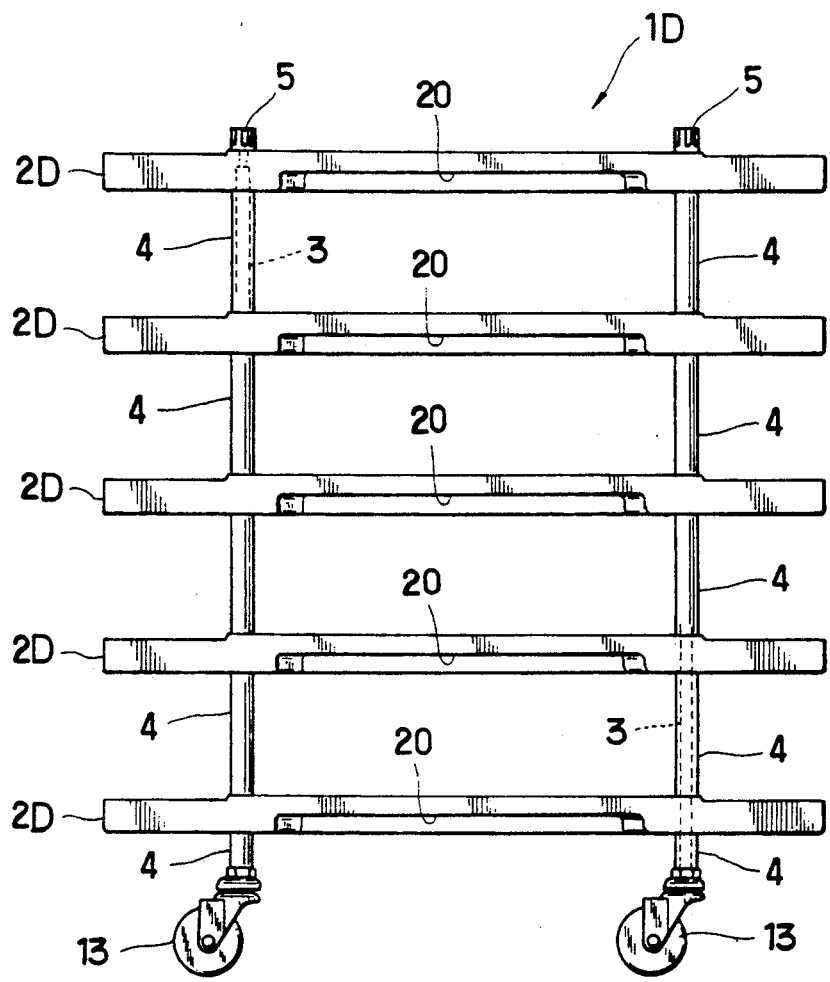
Figure 22:
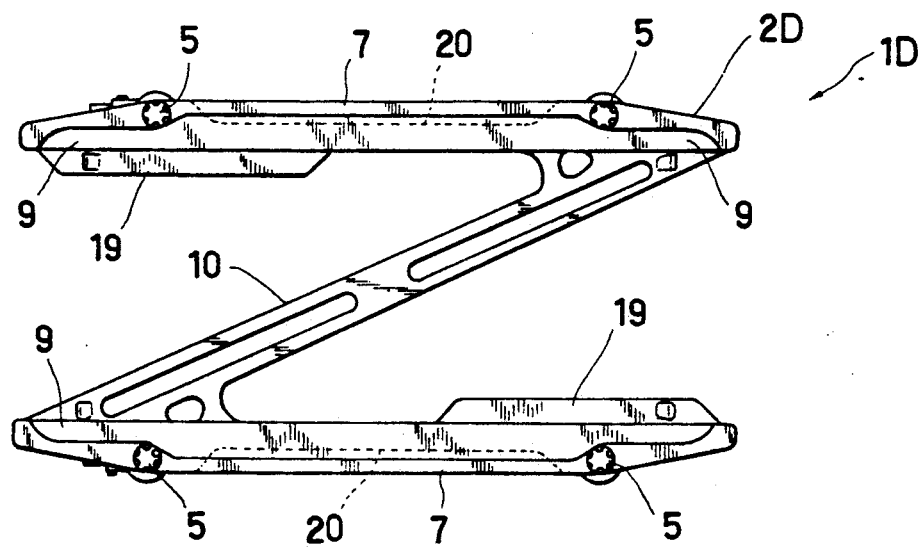
Figure 23:
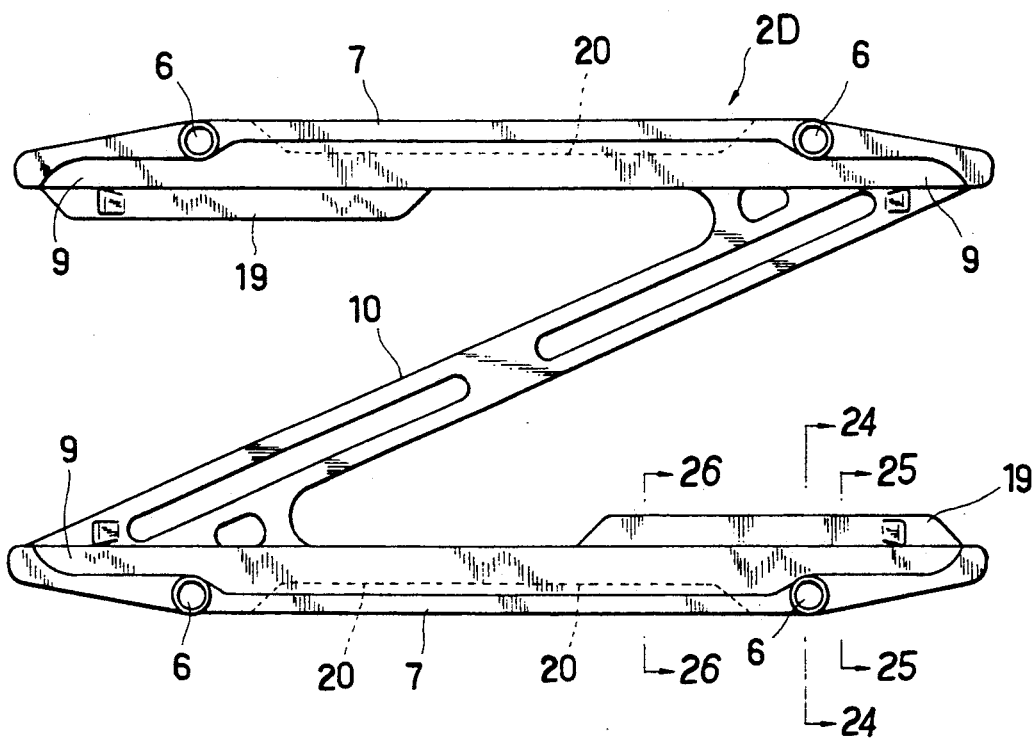
Figure 24:
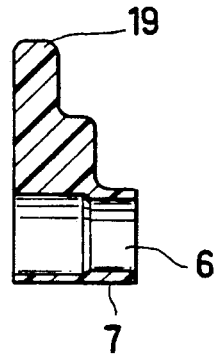
Figure 25:
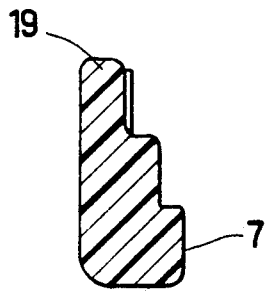
Figure 26:
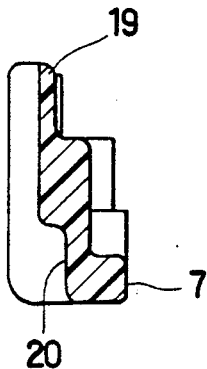

FIGS. 18 to 20 show a fourth embodiment of the present invention which is differentiated from the first embodiment by the fact that each tray support 2C is a hollow form produced by a hollow or blow molding. A tray rack 1C provided with a plurality of the tray supports 2C will also be usable with equal success as the tray rack of the first embodiment.

FIGS. 21 to 26 show a fifth embodiment of the present invention which is differentiated from the first embodiment by the fact that the two side bars 7, 7 of each Z-shaped tray support 2D are provided with inwardly extending projections 19, 19 arranged on the connecting rod 10 side walls thereof respectively for serving as both tray supporting tubs and stoppers and also, with engaging recesses 20, 20 arranged in the outside walls thereof respectively so that each engaging recess 20 accepts the projection 19 of another tray rack when more than two tray racks are nested for storage. Such a tray rack 1D having a plurality of the tray supports 2D can securely hold trays 8 on the tray supports 2D. Also, when a plurality of the tray racks 1D are nested for compact storage, the projections 19 come into engagement with the engaging recesses 20 thus ensuring tightness in the nesting. When separating the tray racks 1D from one another, any two adjacent side bars 7 are spaced by the projecting length of projection 19 so that castors 13 can be prevented from striking each other.

The tray support 2D may be formed of inverted-Z shape with equal success.

Figure 27:
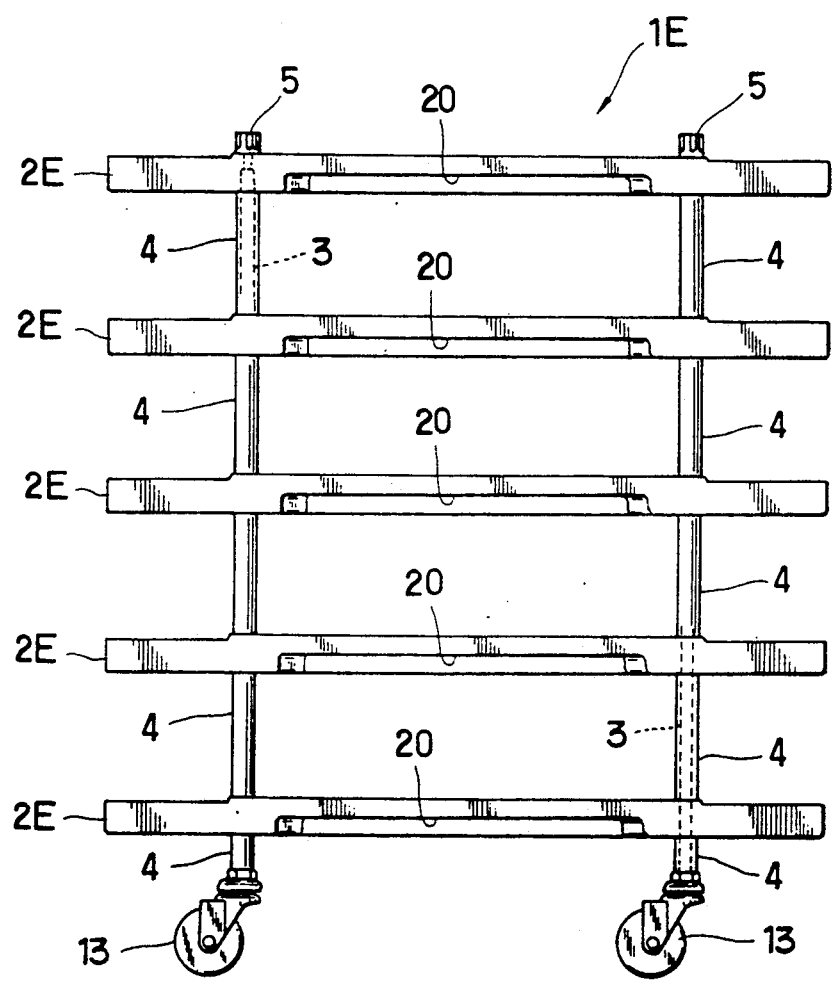
Figure 28:
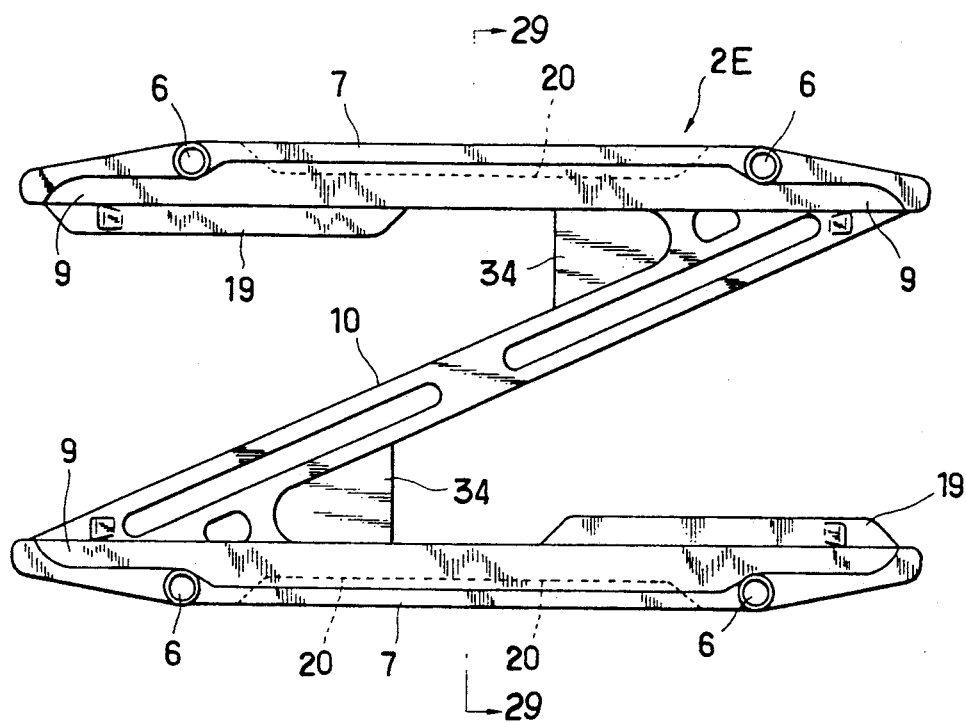
Figure 29:
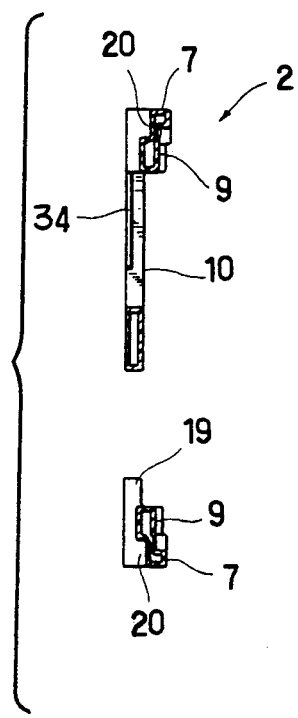
Figure 30:
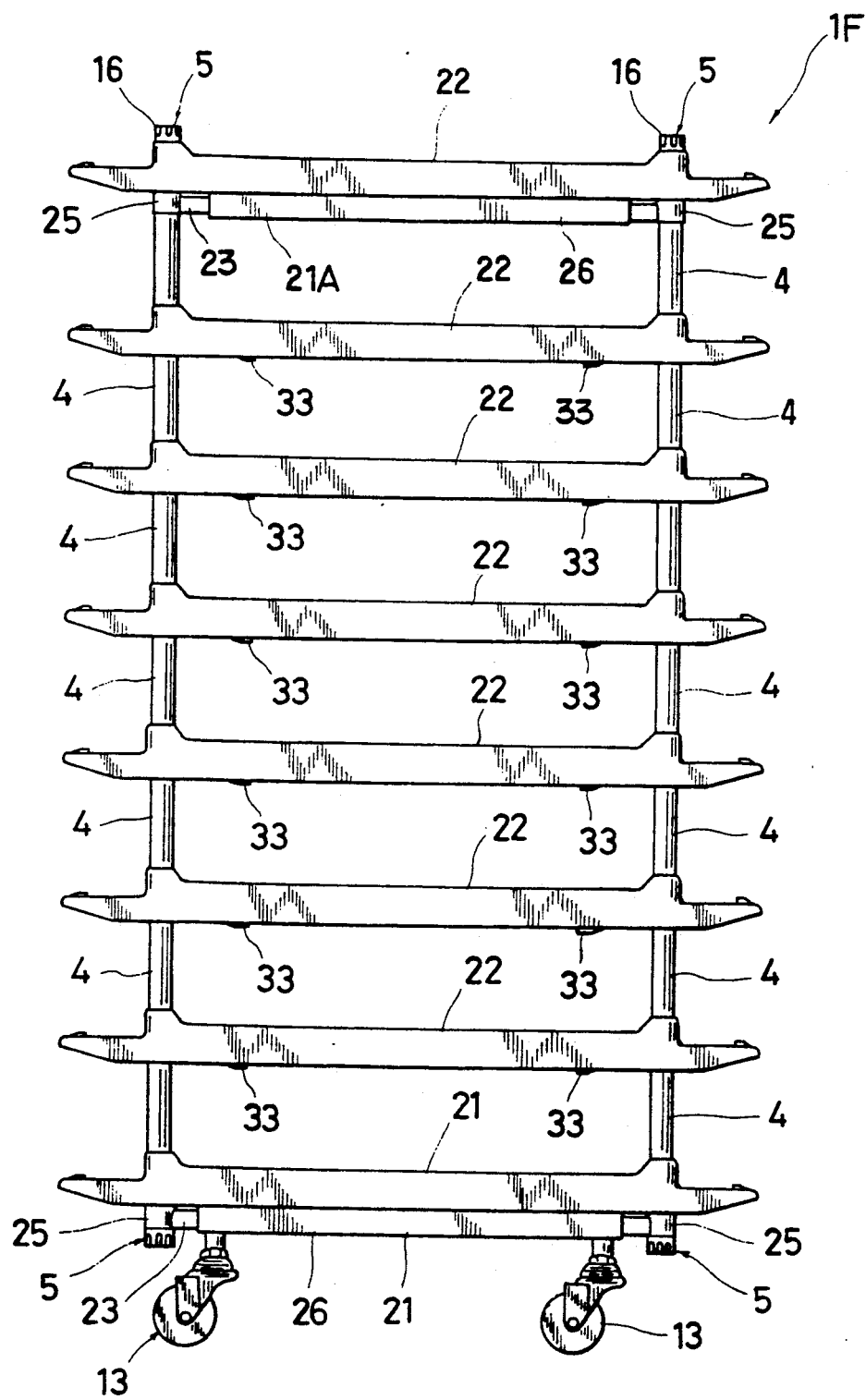
Figure 31:
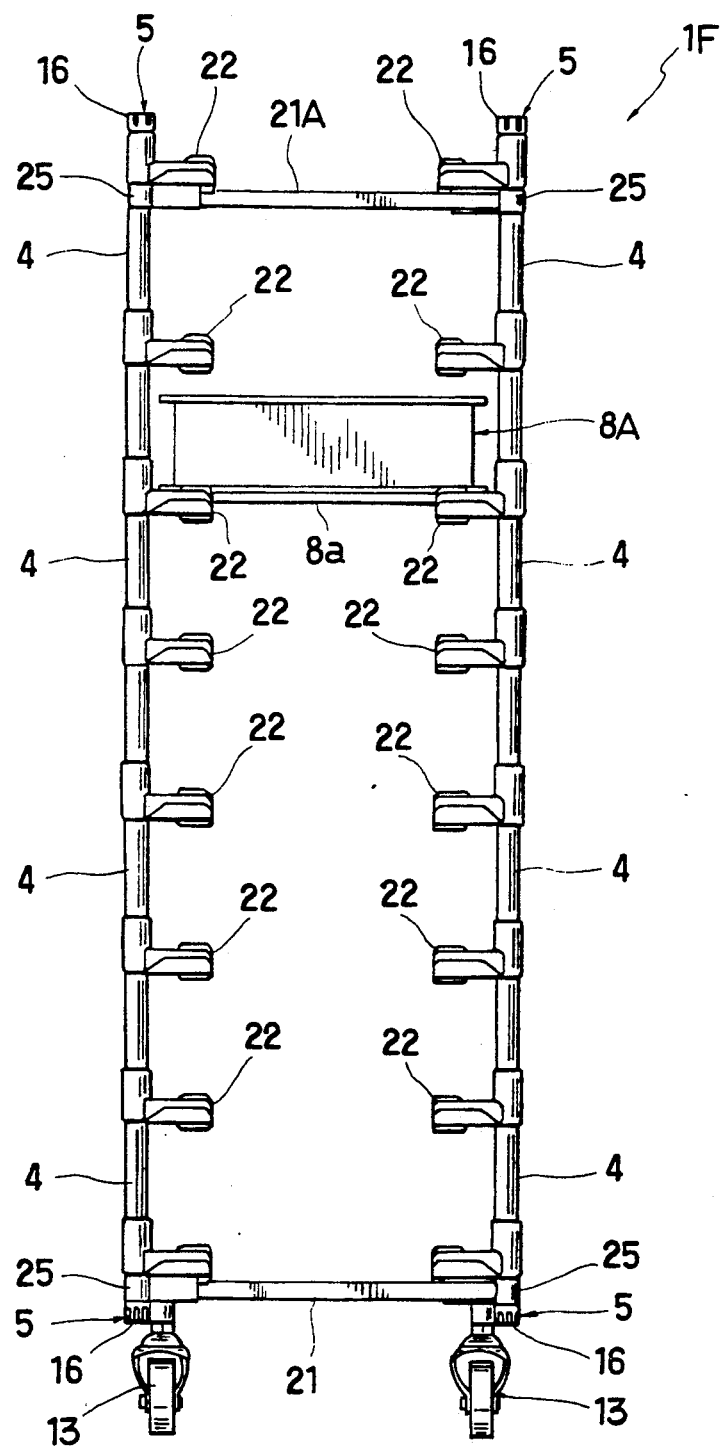
Figure 32:
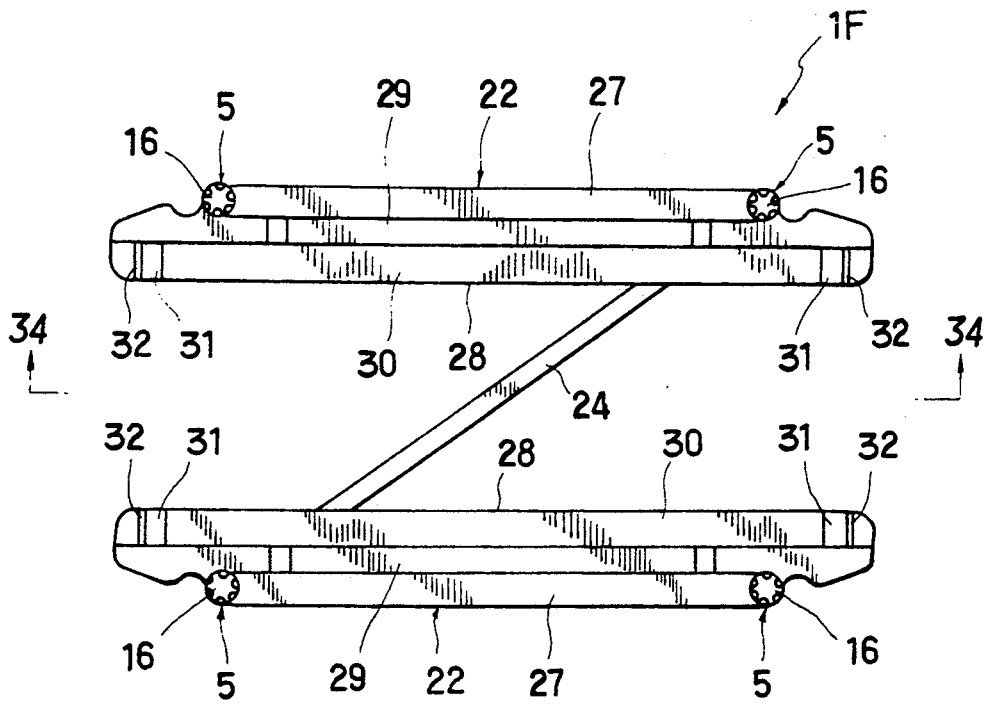
Figure 33:
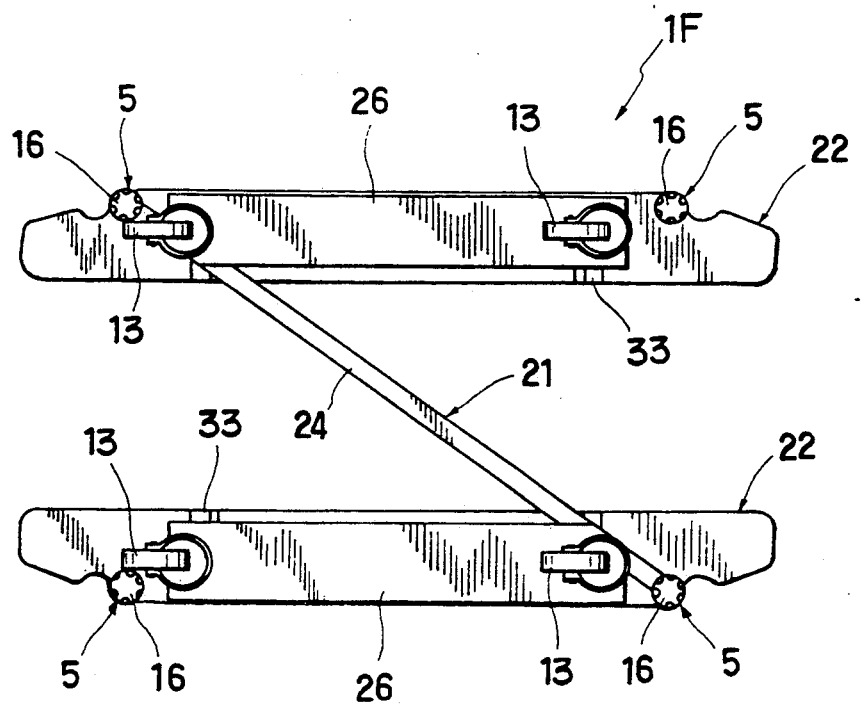
Figure 34:
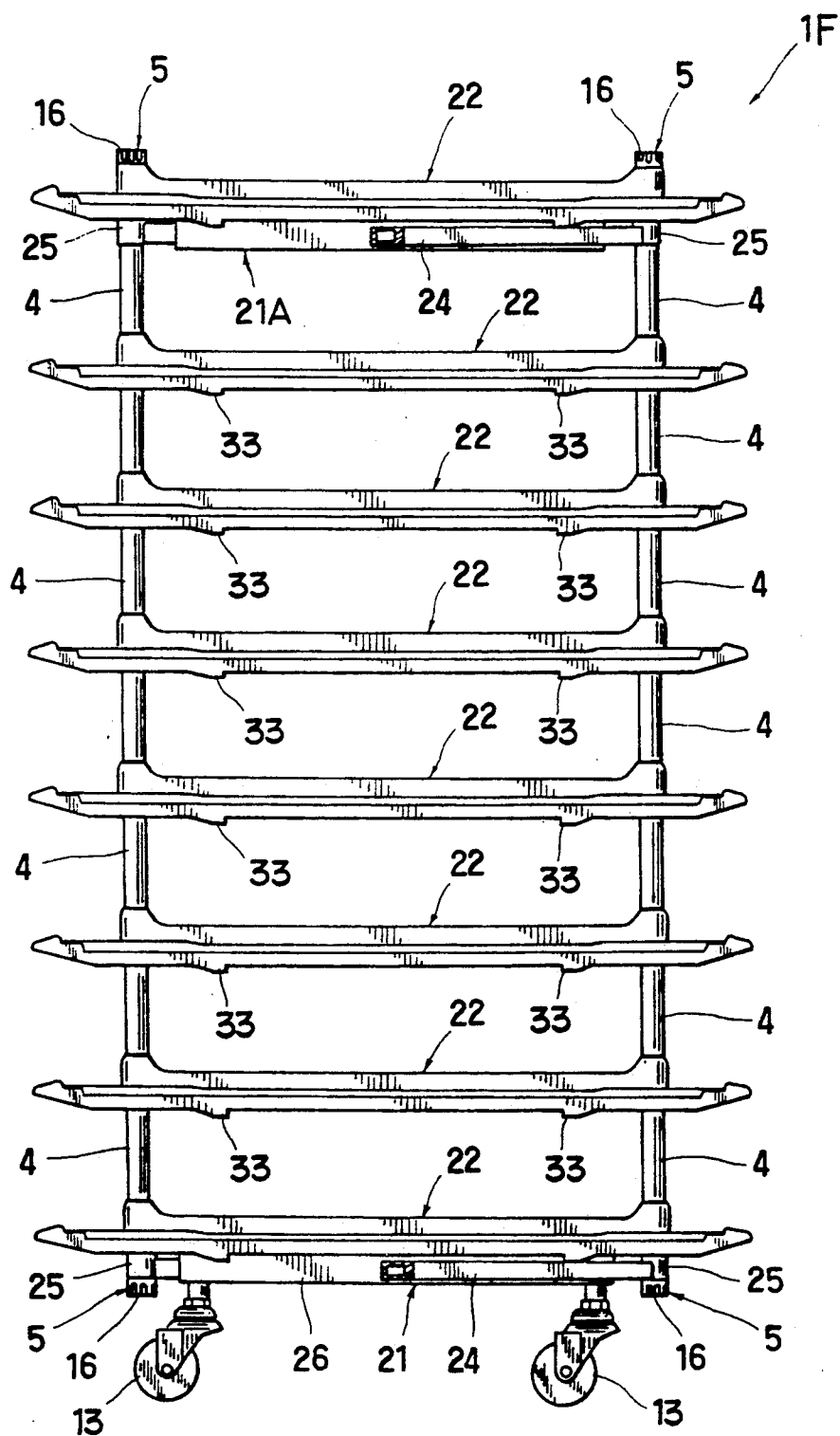
Figure 35:
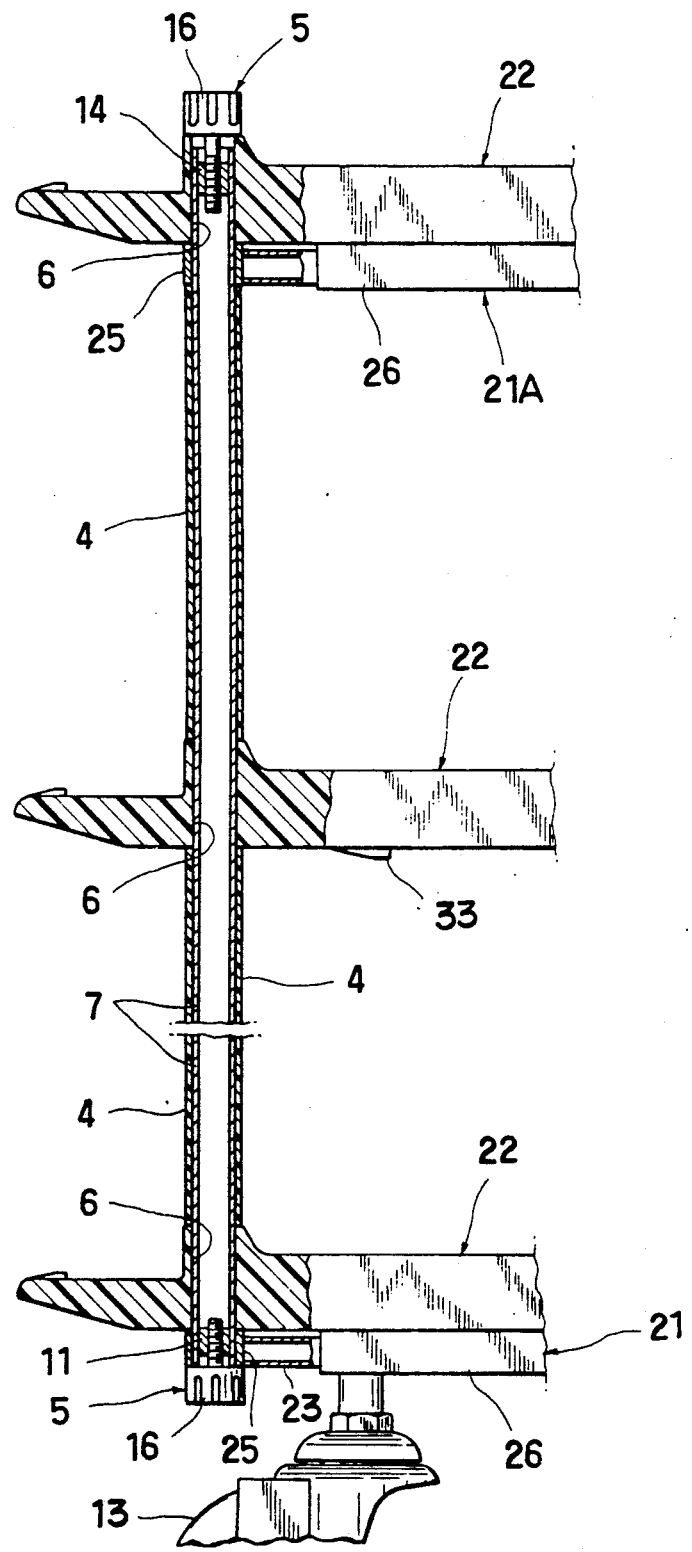

FIGS. 27 to 29 show a sixth embodiment of the present invention which is differentiated from the fifth embodiment shown in FIGS. 21 to 26 by the fact that each tray support 2E is a hollow form and a couple of reinforcement plates 34, 34 are mounted to the acute angle joints between the two side bars 7, 7 and the connecting bar 10 for supporting the distal end of each side bar 7 in nesting. A tray rack 1E provided with a plurality of the tray supports 2E will exhibit the same advantages as the tray rack of the fifth embodiment and also, a satisfactory rigidity.

The tray support 2D of the fifth embodiment shown in FIGS. 21 to 26 may also be furnished with two reinforcement plates 34, 34.

Figure 36:
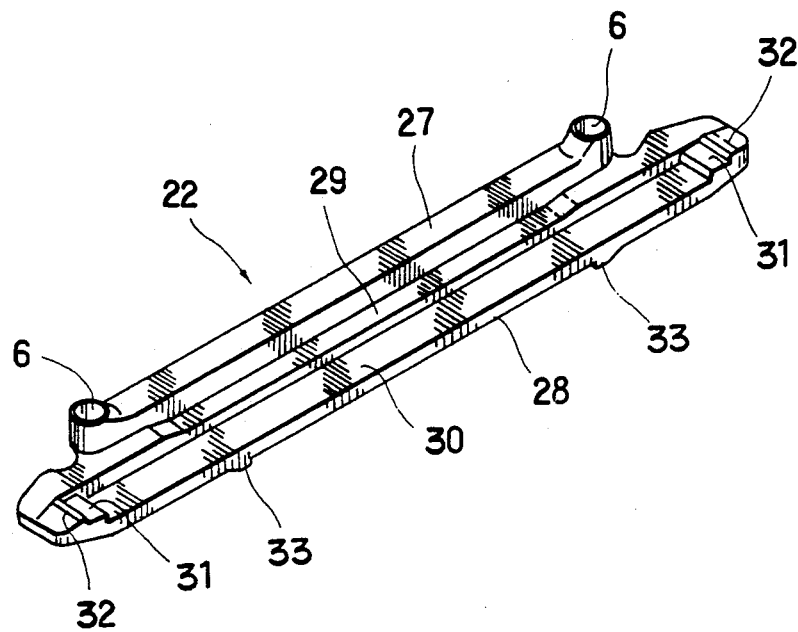
Figure 37:
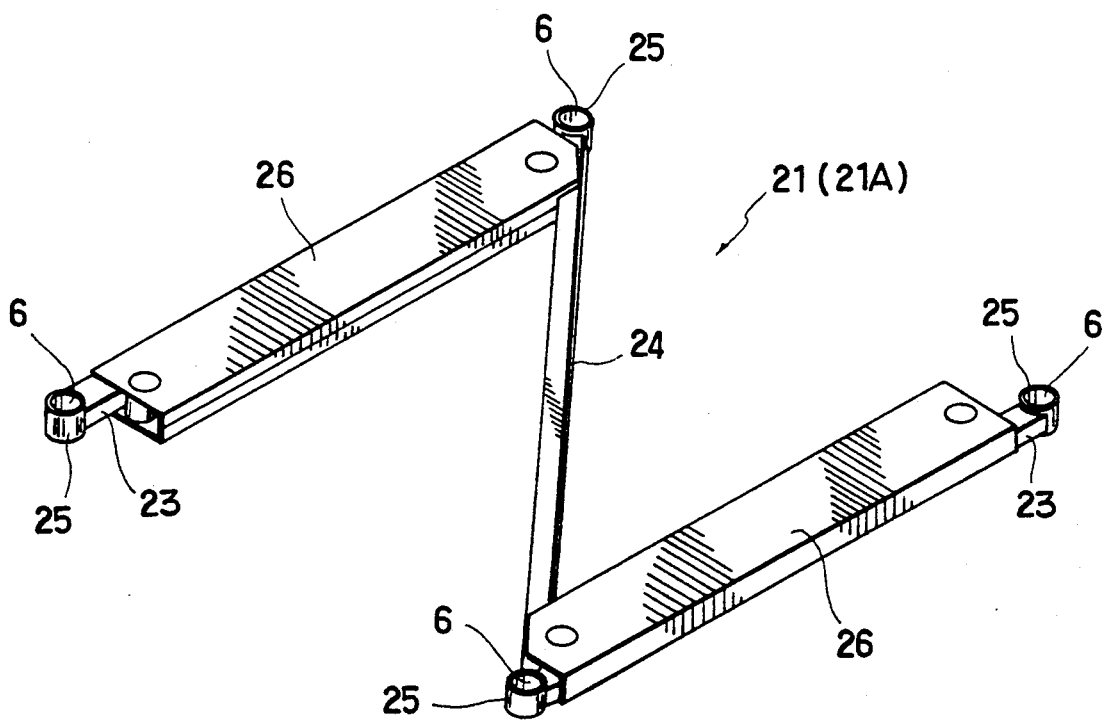
Figure 38:
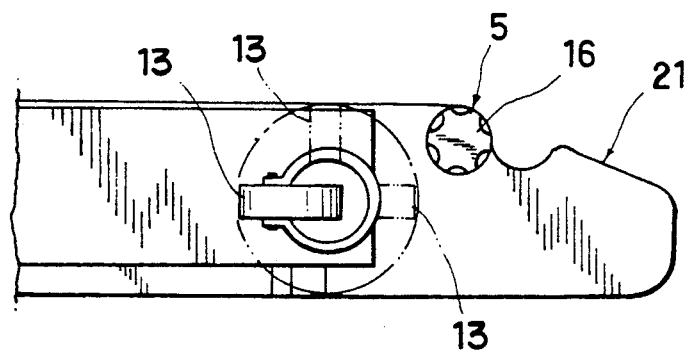
Figure 39:
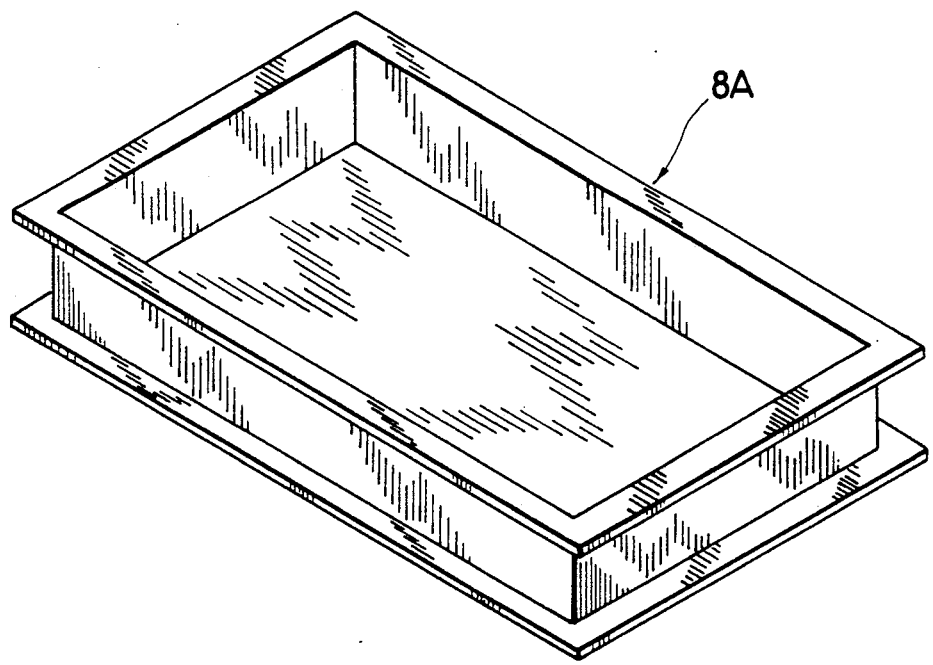
Figure 40:
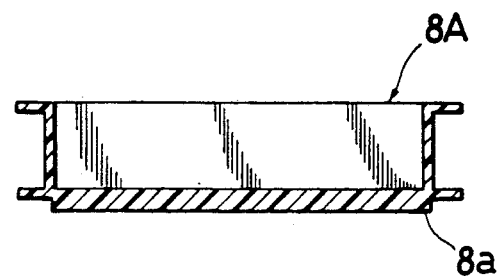
Figure 41:
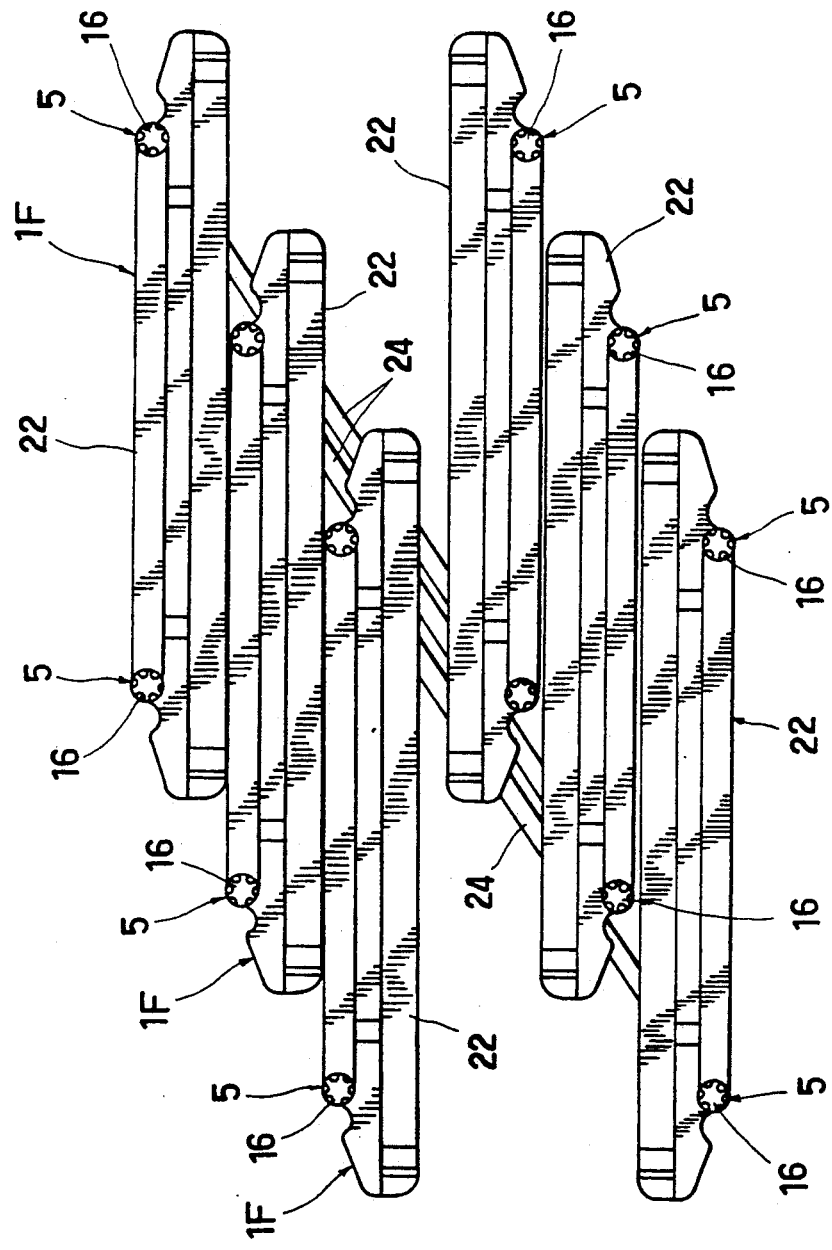
Figure 42:
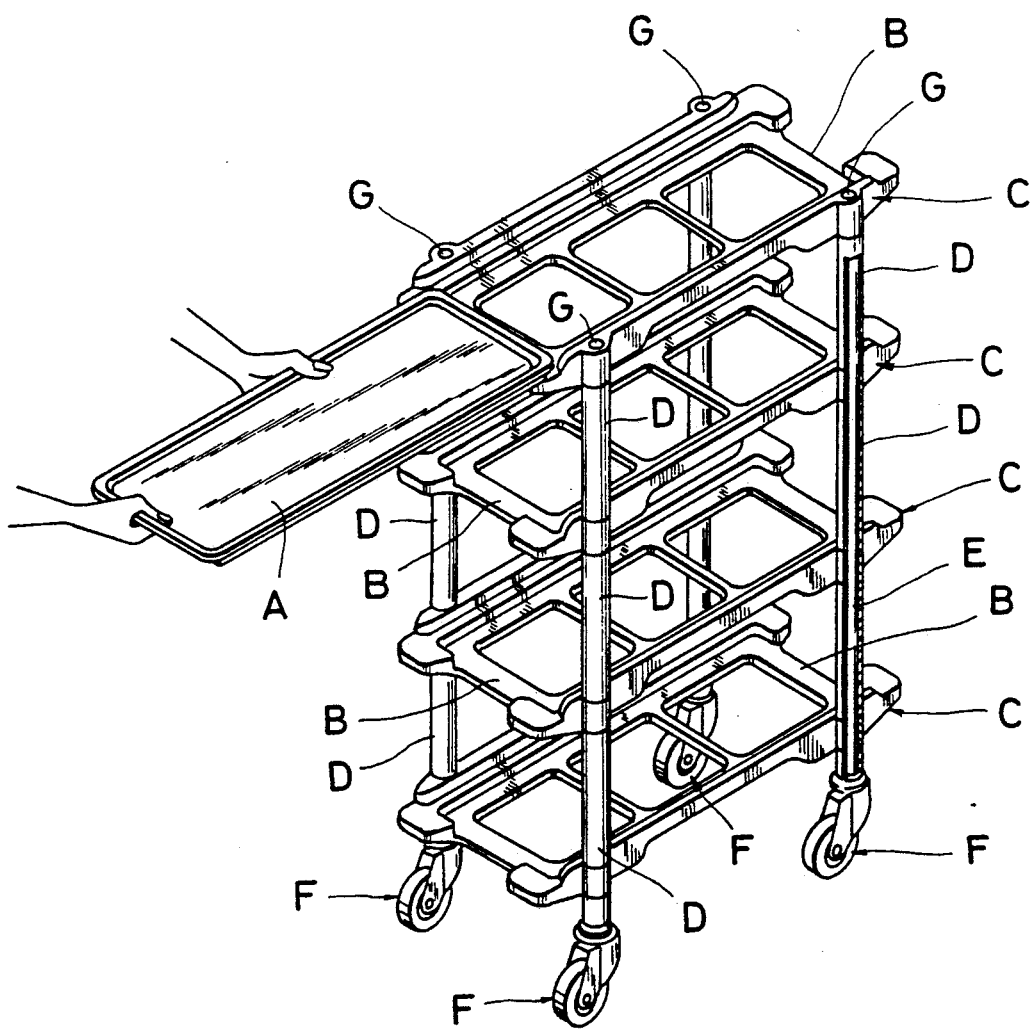
FIG. 42 is an explanatory view showing a prior art tray rack.

FIGS. 30 to 41 show a seventh embodiment of the present invention which is totally differentiated from the first embodiment. More particularly, a tray rack 1F comprises: a lower tray support 21 of approximately Z-shaped form; four castors 13, 13, 13, 13 mounted to the lower surface of the lower tray support 21 so that they can never project from the circumferential edge of the lower tray support 21 as shown in FIG. 38; four upwardly extending supporting columns 3A, 3A, 3A, 3A fixedly fitted into the through holes 6, 6, 6, 6 provided in the four corners of the lower tray support 21; a plurality of tray support pairs 22, 22 mounted at equal intervals to the four supporting columns 3A, 3A, 3A, 3A so that each tray support pair 22, 22 can be situated corresponding to the two side ends of the lower tray support 21 for holding a tray 8A of box shape shown in FIGS. 39 and 40; a plurality of spacer tubes 4 fitted onto the four supporting columns 3A, 3A, 3A, 3A for spacing the tray support pairs 22, 22 at equal intervals; an upper tray support 21A of approximately Z-shaped form mounted to the uppermost ends of the four supporting columns 3A, 3A, 3A, 3A and arranged identical in construction to the lower tray support 21A; and four retainer bolts 5, 5, 5, 5 screwed into the uppermost ends of the four supporting columns 3A, 3A, 3A, 3A respectively for tightly fastening the upper tray support 21A, the tray support pairs 22, 22, the spacer tubes 4, and the lower tray support 21. The tray rack 1F of the seventh embodiment will also provide the same advantage as the first embodiment.

The lower tray support 21 comprises, as shown in FIG. 37, a pair of side bars 23, 23 of metal material, a connecting bar 24 of metal material arranged for joining one end of the side bar 23 with a cross end of the other side bar 23, four column mounting sleeves 25, 25, 25, 25 having center bores 6 respectively and fixedly mounted, e.g. by welding, to the ends of the two side bars 23, 23, and a couple of castor mounting bases 26, 26 mounted on their respective side bars 23, 23 which also serve as reinforcement members for strengthening the Z-shaped arrangement of the two side bars 23, 23 and the connecting bar 24.

Each pair of the tray support shelves 22, 22 are identical in shape. As shown in FIG. 36, the tray support shelf 22 comprises a support plate 27 made of synthetic resin material, two through holes 6, 6 provided in both ends of the support body plate 27 for accepting the two supporting columns 3A, 3A respectively, and a support shelf plate 28 extending inwardly from the lower of the support body plate 27. The support shelf plate 28 has a recess 29 for accepting no load of the tray 8A, a recess 30 for clearing a bottom projection 8a of the tray 8A, two pairs of stoppers 31, 31 and 32, 32 arranged on both sides of the recess 30 for holding a tray 8A of a different size in its corresponding position, and two stopper projections 33, 33 provided on the lower surface thereof for temporarily holding the tray 8A in its half drawn-out state.

As apparent from the foregoing detailed description, the following advantages of the present invention will be ensured.

(1) The tray rack according to the present invention comprises: a plurality of tray supports for supporting trays, each having four through holes in the corners thereof; four supporting columns extending across the four through holes of their respective tray supports and having castors mounted to the lowermost ends thereof respectively; a plurality of spacer tubes fitted onto the four supporting columns for spacing the tray supports at equal intervals, and four retainer screws threaded into the uppermost ends of the supporting columns respectively for tightly fastening the tray supports and the spacer tubes arranged alternately. Each of the tray supports is mainly consisted of a pair of side bars of synthetic resin material, each having through holes provided in both ends thereof and a tray supporting recesses in the upper inner wall thereof, and a connecting bar of synthetic resin material arranged for joining one end of the side bar with a cross end of the other side bar, thus forming an inverted-Z or Z-shaped construction. Accordingly, the track trays can be nested for storage or transportation.

A greater number of the tray racks can be stored in a given space than with conventional tray racks.

(2) According to the arrangement of the tray rack depicted in the preceding paragraph (1), a greater number of tray racks can be carried in a transportation lot and the cost of transportation is decreased.

(3) According to the arrangement of the tray rack depicted in the preceding paragraph (1), the tray racks can be nested in a traverse direction for more compact, neat storage.

(4) According to the arrangement of the tray rack depicted in the preceding paragraph (1), a tray can be inserted from one side of the tray rack and supported by the tray supporting recesses of the two side bars and the connecting bar in steadiness. The tray can also be removed with ease from the wide opening between the two side bars.

The various disclosed embodiments of the present invention will provide the same advantages as depicted in the preceding paragraphs (1) to (4).

What is claimed is:

1. A tray rack comprising:
 a plurality of tray supports for supporting trays, each tray support having four corners and four through holes in the corners thereof;
 four supporting columns extending across the four through holes of respective tray supports and having castors mounted to lowermost ends thereof respectively;
 a plurality of spacer tubes fitted onto the four supporting columns for spacing the tray supports at equal intervals; and
 four retainer members attached to uppermost ends of the supporting columns respectively for tightly fastening the tray supports and the spacer tubes arranged alternately;
 said tray support comprising a pair of side bars of synthetic resin material, each side bar having the through holes provided in first and second ends thereof and tray supporting recesses provided in an upper inner wall thereof, and a connecting bar of synthetic resin material arranged for joining the first end of one side bar with an opposed second end of another side bar to form an inverted-Z of Z-shaped construction.

2. A tray rack according to claim 1, wherein the tray support comprising the connecting bar and the two side bars is reinforced with an inverted-Z or Z-shaped reinforcement bar of metal material mounted thereto or inserted therein.

3. A tray rack according to claim 1, wherein the tray support is formed of a hollow shape of a molded synthetic resin material.

4. A tray rack according to claim 1, wherein the pair of side bars of the tray support are provided with inwardly extending projections arranged on distal end side inner walls of said side bars respectively for serving as both tray supporting tubs and stoppers, and also provided with engaging recesses arranged in outside walls of said side bars respectively so that each projection comes into engagement with a corresponding recess of another tray rack when more than two tray racks are nested for storage.

5. A tray rack comprising:
 a lower tray support having four corners and formed of approximately inverted-Z or Z shape;
 four castors mounted to close-to-corner regions of a lower surface of the lower tray support respectively;
 four column mounting members arranged on the four corners of the lower tray support respectively;
 four upwardly extending supporting columns mounted to the four column mounting members of the lower tray support;
 a plurality of tray support shelves mounted in pairs to the four supporting columns so that the pairs of the tray support shelves can vertically be arranged at equal intervals and situated corresponding to two side ends of the lower tray support;
 an upper tray support formed of approximately inverted-Z or Z shape and mounted to uppermost ends of the four supporting columns; and
 four retainer members threaded into the uppermost ends of the four supporting columns respectively for tightly fastening the upper tray support, the tray support shelves, and the lower tray support.

6. A tray rack according to claim 5, wherein the four castors are mounted to the close-to-corner regions of the lower surface of the lower tray support so that they can never project outwardly from a circumferential edge of the lower tray support.

7. A tray rack according to claim 5, wherein a plurality of spacer tubes are fitted onto the four supporting columns for spacing the tray support shelves at equal intervals.

* * * * *